United States Patent
Dorofeev et al.

(10) Patent No.: US 7,036,123 B2
(45) Date of Patent: Apr. 25, 2006

(54) SYSTEM USING FAIR-SHARE SCHEDULING TECHNIQUE TO SCHEDULE PROCESSES WITHIN EACH PROCESSOR SET BASED ON THE NUMBER OF SHARES ASSIGNED TO EACH PROCESS GROUP

(75) Inventors: Andrei V. Dorofeev, Sunnyvale, CA (US); Andrew G. Tucker, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 658 days.

(21) Appl. No.: 09/843,426

(22) Filed: Apr. 25, 2001

(65) Prior Publication Data

US 2002/0161817 A1    Oct. 31, 2002

(51) Int. Cl.
*G06F 9/46* (2006.01)

(52) U.S. Cl. .................. 718/102; 718/100; 718/103; 718/107

(58) Field of Classification Search ............... 718/100, 718/102, 103, 104, 105, 107; 709/203, 226, 709/243
See application file for complete search history.

(56) References Cited

U.S. PATENT DOCUMENTS

| | | | | |
|---|---|---|---|---|
| 5,287,508 A | * | 2/1994 | Hejna et al. ............... | 718/102 |
| 5,414,849 A | * | 5/1995 | Yamamoto ................. | 717/149 |
| 5,925,102 A | * | 7/1999 | Eilert et al. ................ | 709/226 |
| 5,995,904 A | * | 11/1999 | Willen et al. .............. | 702/14 |
| 6,105,053 A | * | 8/2000 | Kimmel et al. ............ | 718/105 |
| 6,112,023 A | * | 8/2000 | Dave et al. ................ | 703/27 |
| 6,247,041 B1 | * | 6/2001 | Krueger et al. ............ | 718/104 |
| 6,269,391 B1 | * | 7/2001 | Gillespie ................... | 718/100 |
| 6,360,303 B1 | * | 3/2002 | Wisler et al. .............. | 711/152 |
| 6,442,583 B1 | * | 8/2002 | Eilert et al. ................ | 718/104 |

(Continued)

FOREIGN PATENT DOCUMENTS

JP    62011941 A    * 1/1987

OTHER PUBLICATIONS

Product & Services:Chapter 8—Fair Share Scheduler. Sun Microsystems 1994.*

(Continued)

*Primary Examiner*—Meng-Al T. An
*Assistant Examiner*—Lilian Vo
(74) *Attorney, Agent, or Firm*—Osha Liang LLP

(57) ABSTRACT

Described is a scheduling system that provides allocation of system resources of one or more processor sets among groups of processes. Each of the process groups is assigned a fixed number of shares, which is the number that is used to allocate system resources among processes of various process groups within a given processor set. The described fair share scheduler considers each processor set to be a separate virtual computer. Different process sets do not share processes, a particular process must execute on a single processor set. In another embodiment of the invention, each process group could be given a separate number of shares for each processor set. Percentage of the resources of the specific processor set allocated to processes of a process group is calculated as a ratio of the shares of the process group on the processor set to the total number of shares of active process groups operating in that set. The process group is considered active on a processor set, if that processor set executes at least one process of that process group.

9 Claims, 1 Drawing Sheet

$P_{1-5}$ = 20% (1/5th) of the system resources.

U.S. PATENT DOCUMENTS

| | | | |
|---|---|---|---|
| 6,457,008 B1* | 9/2002 | Rhee et al. | 707/10 |
| 6,535,773 B1* | 3/2003 | Takata et al. | 700/99 |
| 6,539,542 B1* | 3/2003 | Cousins et al. | 717/151 |
| 6,668,269 B1* | 12/2003 | Kamada et al. | 718/103 |
| 6,687,735 B1* | 2/2004 | Logston et al. | 709/203 |
| 6,708,226 B1* | 3/2004 | Peters et al. | 719/318 |
| 6,714,960 B1* | 3/2004 | Bitar et al. | 718/103 |
| 2002/0099849 A1* | 7/2002 | Alfieri et al. | 709/243 |
| 2003/0021228 A1* | 1/2003 | Nakano et al. | 370/229 |

OTHER PUBLICATIONS

Galvin, Peter. CTO' Corner: Solaris Resource Management—The Fair Share Scheduler. Corporate Technologies, Inc. 1995.*

J. Kay, P. Lauder, "A Fair Scheduler," Communications of the ACM, vol. 31(1), pp. 44-55, Jan. 1988, USA.

Andrew Bettison, Andrey Gollan, Chris Maltby, Neil Russell, "Share II—A User Administration Resource Control System For UNIX", download from URL http://www.c-side.com/c/papers/lisa-91.html (Jul. 10, 2001).

"Solaris Resource manager—Controlling System Resources Effectively," White Paper, Sun Microsystems, Palo Alto, California, Oct. 1998.

Manual Page for PSRSET—creation and management of processor sets, Documentation distributed with Solaris Operating ystem 5.8, Sun Microsystems, Palo Alto, California, Dec. 10, 1998.

* cited by examiner $P_{1-5} = 20\% \ (1/5\text{th})$ of the system resources.

SYSTEM USING FAIR-SHARE SCHEDULING TECHNIQUE TO SCHEDULE PROCESSES WITHIN EACH PROCESSOR SET BASED ON THE NUMBER OF SHARES ASSIGNED TO EACH PROCESS GROUP

FIELD

The present invention generally relates to techniques for managing load of a central processing unit in a computer system. The present invention also relates to techniques for allocating central processing unit percentage usage among several processes.

BACKGROUND

Modern high performance computer systems are capable of supporting multiple users and executing multiple processes or applications started by different users at the same time. Term scheduling refers to allocation of central processor unit (CPU) resources among multiple processes owned by different users in a computer system. It will be appreciated by persons of skill in the art that the fraction of the total CPU resources allocated to a particular process may depend on the number of other processes in the system and a relative importance of the process in comparison with the other processes in the system.

Another way of allocating system resources is to provide a process group, rather than a single process, with a fixed share of CPU resources. In other words, one or more processes executing on a central processing unit of a computer system can be combined into process groups, and each process group is allocated a share of the system resources that are distributed among individual processes of this process group. The system resources can be distributed among processes of the process group in an equal or unequal manner. The processes can be combined into aforementioned process groups based on various criteria, including, but not limited to, user id of the user executing the process, group id of the user executing the process, or based on any other appropriate classification. The nature of the classification is not critical to the present invention.

Modern operating systems include the concept of processor sets, which is a group of processing executing on a specific set of processors. Only those processes that are explicitly bound to a processor set are permitted to be executed on processors that belong to that processor set. Presently, there exists no resource allocation scheme that would leverage the advantages of the processor set architecture and have an ability to distribute CPU resources among multiple process groups in a pre-defined manner.

SUMMARY

To overcome the limitations described above, and to overcome other limitations that will become apparent upon reading and understanding the present specification, apparatus, methods and articles of manufacture are disclosed that allocate a percentage of system resources among process groups in a computer system having one or more processor sets.

According to the inventive method, processes are combined into process groups based on a pre-defined criteria. Each of the process groups is assigned a number of shares representing relative importance of the group within its processor set. The inventive system allocates the system resources of the processor sets to process groups according to the number of shares assigned to a particular process group and the total number of shares of all active process groups in the processor set. A process group is considered active on a processor set if there is at least one process of this process group executing on that processor set.

DESCRIPTION OF THE DRAWINGS

Various embodiments of the present invention will now be described in detail by way of example only, and not by way of limitation, with reference to the attached drawings wherein identical or similar elements are designated with like numerals.

DETAILED DESCRIPTION

Figure 1:
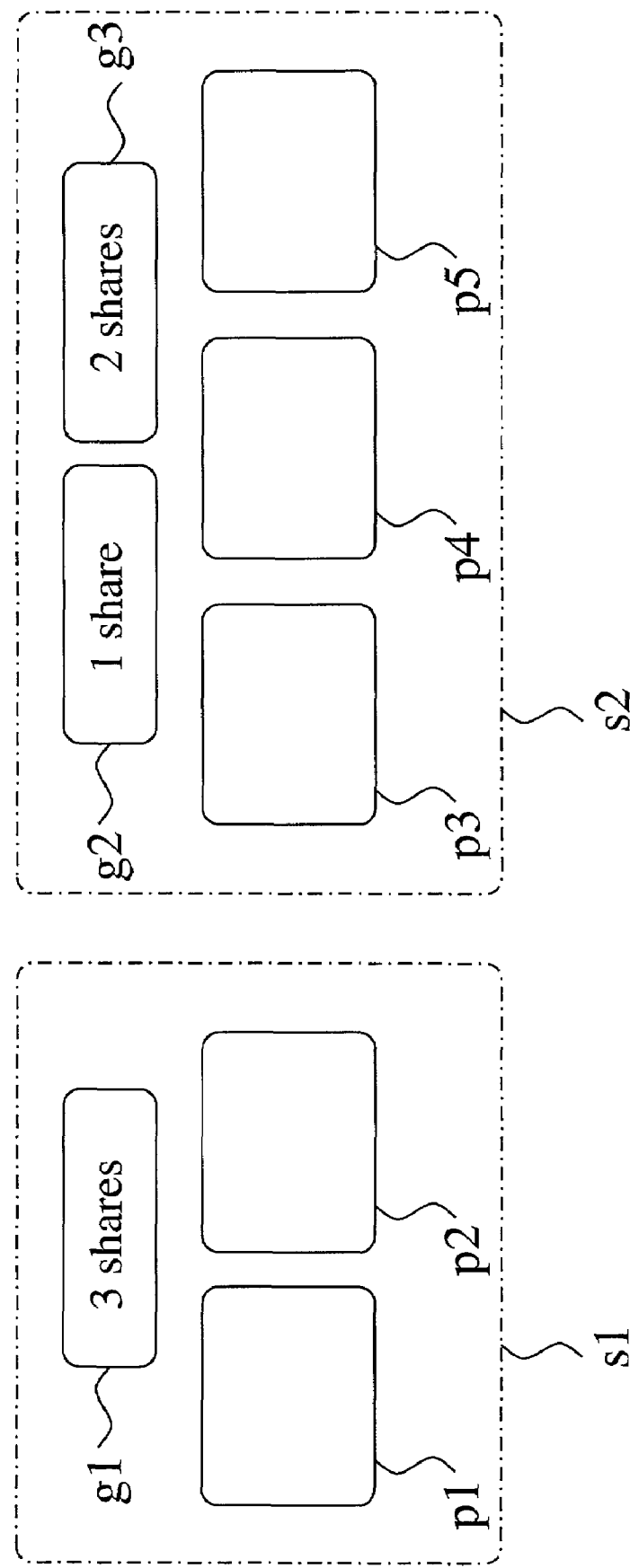
FIG. 1 illustrates exemplary allocation of system resources according to the inventive concept.

Fair share scheduling is a way to assign a particular process a fixed share of CPU resources. The fair share scheduler, as described in the white paper by J. Kay and P. Lauder is using the term share to describe the relative importance of one workload versus another.

According to one of the aspects of the present invention, various processes in the system are combined into one or more process groups. These process groups users are assigned a number of shares which represent relative importance thereof. This is a way to guarantee application performance by explicitly allocating shares (or percentage) of system CPU resources among competing workloads. Note that total number of shares assigned to all process groups need not be 100. Furthermore, to obtain the percentage of the system CPU resources available to a process group at each given moment of time, a total number of shares allocated to that process group must be divided by the total number of shares possessed by all currently active process groups. A process group is considered active when it has at least one running or runnable process. Indeed, to ensure the complete, or 100% utilization of the system, only process groups which have executing processes at a particular time should be given share of the CPU usage. Note that such active process groups are searched across the entire system. At any given time, the percentage of the CPU allocated to a particular process group depends on the number of shares owned by all other active process groups in the system, or the process groups that have at least one executing process in the system. Therefore, in a system where processes are combined into process groups based on user id, any new logged user with a given number of shares can decrease the CPU percentage of all other actively running users.

Modern operating systems, such as a Solaris Operating System distributed by Sun Microsystems, Inc. of Palo Alto, Calif. have a concept of processor sets. Processor set concept applies to multiple processor computers and allows the binding of one or more processors into groups of processors. Processors assigned to processor sets will run only processes that have been bound to that processor set. In other words, the aforementioned processor set is essentially a virtual single- or multi-processor computer system within a physical computer, which has its own set of running processes. The concept of processor set is especially helpful, for example, when certain important process need to be provided with a separate one or more processors. For example, in a computer system providing services to http clients, a separate processor set can be allocated to running a web server, while all other processes can be executed on a second, separate processor set. In this case, the amount of CPU resources allocated to the web server will not depend on the other processes executing in the system.

However, when the aforementioned processor sets are used in conjunction with the conventional fair share scheduler, the performance of processes running on one processor set may be impacted by the work performed by processes running on another processor set, which is an undesirable effect.

The reason why the existing fair share scheduler does not work satisfactorily with processor sets is because that total number of shares for all active process groups is calculates across the entire system, when in fact it should be calculated only within boundaries of the current processor set. If the total number of shares is kept separate for each processor set, then the CPU allocation for a given process group will only depend on other process groups who have their active processes on the same processor set. The work done on other processor sets will be unaffected. This is more intuitive behavior of such configurations than what it has been in the past.

The inventive fair share scheduler will now be described in detail. According to the inventive concept, various processes in a computer system are combined into process groups. Each of these process groups is assigned a fixed number of shares, which is the number that represents relative importance of process groups. The number of shares of a process group is used to allocate system resources among processes of that process group executing within a predetermined processor set, in the manner described in detail below. Specifically, the inventive fair share scheduler considers each processor set to be a separate virtual computer. Different processor sets do not share processes, in other words, a process must execute on a single processor set.

In one embodiment of the invention, each process group is given the same number of shares for all processor set. It should be noted that even if process group has zero shares, processes of this process group may still be executed on processor sets, which do not have any other active process groups. Percentage of the resources of the specific processor set allocated to processes of a particular process group is calculated as a ratio of the shares of that process group on the processor set to the total number of shares of all active process groups operating in that set. The process group is considered active on a processor set, if that processor set executes at least one process of that process group.

Now, an exemplary illustration of the inventive scheduling concept will be presented, see FIG. 1. In this illustration, a computer system includes five processors: p1–p5 and three process groups g1, g2 and g3. The processors p1 and p2 constitute processor set s1. Processors p3, p4, and p5 are combined into processor set s2. Group g1 is assigned 3 shares and it is executing on the processor set s1. Process groups g2 and g3 are assigned 1 and 2 shares respectively, and they both execute on processor set s2.

The conventional fair share scheduler described above would allocate the system resources without reference to the processor sets. Specifically, it would assign $3/(3+1+2)=3/6=50\%$ of the entire system resources to group g1. Group g2 would receive $1/(3+1+2)=1/6=16.7\%$, while group g3 would get $2/(3+1+2)=2/6=33.3\%$ of the system resources.

The inventive system, on the other hand, group g1 receives entire processor set s1, which is $40\%=100\% * 2/5$ of the total system resources. Groups g2 and g3 jointly executing on processor set s2 receive $1/3 * 3/5=1/5=20\%$ and $2/3 * 3/5=2/5=40\%$ of the system resources, respectively. It should be noted that the percentage of the system resources assigned to process group g1 is independent of the number of the process groups and the load of the processor set s2.

While the invention has been described herein with reference to preferred embodiments thereof, it will be readily apparent to persons of skill in the art that various modifications in form of detail can be made with respect thereto without departing from the spirit and scope of the invention as defined in and by the appended claims. For example, the present invention is not limited allocating CPU shares only. Generally, processes, users, or groups of users can be allocated shares relating to various system resources, such as CPU, disk or memory usage. In addition, shares need not be assigned to groups of users. According to the inventive concept, shares can be assigned to processes, users, or groups of users, or in any other manner. It will also be appreciated by those of skill in the art, that a number of processors in a processor set may not be an integer number. In other words, the concept of processor set should be viewed, in the context of the present invention, as allocating shares of the total processor resources of a computer system among virtual computers (processor sets), that do not share processes, rather than simply combining resources of physical CPUs. Finally, each process group could be given a separate number of shares for each processor set.

Those of skill in the art will undoubtedly appreciate that the invention can be implemented on a wide variety of computer systems including, but not limited to, general purpose computers and special purpose computers such as network appliances. As well known in the art, a computer consists at least of a central processing unit, a memory unit, and an input/output interface. The aforementioned computer components can be arranged separately, or they can be combined together into a single unit. The computer memory unit may include a random access memory (RAM) and/or read only memory (ROM). The present invention can be implemented as a computer program embodied in any tangible storage medium, or loaded into the computer memory by any known means. As an alternative to implementing the present invention as a computer program, the present invention can be also embodied into an electronic circuit. This embodiment may provide an improved performance characteristics.

The invention claimed is:

1. A computer implemented method for allocating a percentage of system resources among a plurality of process groups in a computer system, said computer system comprising a plurality of central processing units, said plurality of central processing units bound into a plurality of processor sets, said method comprising:

assigning each of said plurality of process groups a number of shares of at least one of the plurality of processor sets, wherein the number of shares represent a relative importance of each of said plurality of process groups within its at least one of the plurality of processor sets; and allocating said system resources of said plurality of processor sets to each of said plurality of process groups associated with said at least one of the plurality of processor sets according to the number of shares assigned to each of said plurality of process groups associated with said at least one of the plurality of processor sets, wherein said allocating system resources comprises implementing fair-share scheduling independently within each of said plurality of processor sets, wherein implementing fair-share scheduling comprises assigning each of said plurality of process groups a fixed number of shares of said system resources, wherein said percentage of said system resources is calculated based on a ratio of the number of shares assigned to each of said plurality of process groups to a total number of shares of all active process groups within each of said at least one of the plurality of processor sets.

2. The method of claim 1, wherein said system resources of each of the plurality of processor sets are allocated based on a total number of shares of all active processor groups within each of the plurality of processor sets.

3. The method of claim 1, wherein each of said plurality of process groups includes only one process.

4. A computer readable medium embodying a program for allocating a percentage of system resources among a plurality of process groups in a computer system, said computer system comprising a plurality of central processing units, said plurality of central processing units bound into a plurality of processor sets, said program comprising:

assigning each of said plurality of process groups a number of shares of at least one of the plurality of processor sets, wherein the number of shares represent a relative importance of each of said plurality of process groups within its at least one of the plurality of processor sets; and allocating said system resources of said plurality of processor sets to each of said plurality of process groups associated with said at least one of the plurality of processor sets according to the number of shares assigned to each of said plurality of process groups associated with said at least one of the plurality of processor sets, wherein said allocating system resources comprises implementing fair-share scheduling independently within each of said plurality of processor sets, wherein implementing fair-share scheduling comprises assigning each of said plurality of process groups a fixed number of shares of said system resources, wherein said percentage of said system resources is calculated based on a ratio of the number of shares assigned to each of said plurality of process groups to a total number of shares of all active process groups within each of said at least one of the plurality of processor sets.

5. The computer readable medium of claim 4, wherein said system resources of each of the plurality of processor sets are allocated based on a total number of shares of all active processor groups within each of the plurality of processor sets.

6. The computer readable medium of claim 4, wherein each of said plurality of process groups includes only one process.

7. A computer system comprising at least a central processing unit and a memory, said memory storing a program for allocating a percentage of system resources among a plurality of process groups in a computer system, said computer system comprising a plurality of central processing units, said plurality of central processing units bound combined into a plurality of processor sets, said program comprising:

assigning each of said plurality of process groups a number of shares of at least one of the plurality of processor sets, wherein the number of shares represent a relative importance of each of said plurality of process groups within its at least one of the plurality of processor sets; and allocating said system resources of said at least one of the plurality of processor sets to each of said plurality of process groups associated with said at least one of the plurality of processor sets according to the number of shares assigned to each of said plurality of process groups associated with said at least one of the plurality of processor sets, wherein said allocating system resources comprises implementing fair-share scheduling independently within each of the plurality of processor sets, wherein implementing fair-share scheduling comprises assigning each of said plurality of process groups a fixed number of shares of said system resources, wherein said percentage of said system resources is calculated based on a ratio of the number of shares assigned to each of said plurality of process groups to a total number of shares of all active process groups within each of said at least one of the plurality of processor sets.

8. The computer system of claim 7, wherein said system resources of each of the plurality of processor sets are allocated based on a total number of shares of all active processor groups within each of the plurality of processor sets.

9. The computer system of claim 7, wherein each of said plurality of process groups includes only one process.

* * * * *